E. P. COWLES.
MOTOR VEHICLE.
APPLICATION FILED APR. 7, 1914.
1,193,766.
Patented Aug. 8, 1916.
3 SHEETS—SHEET 1.
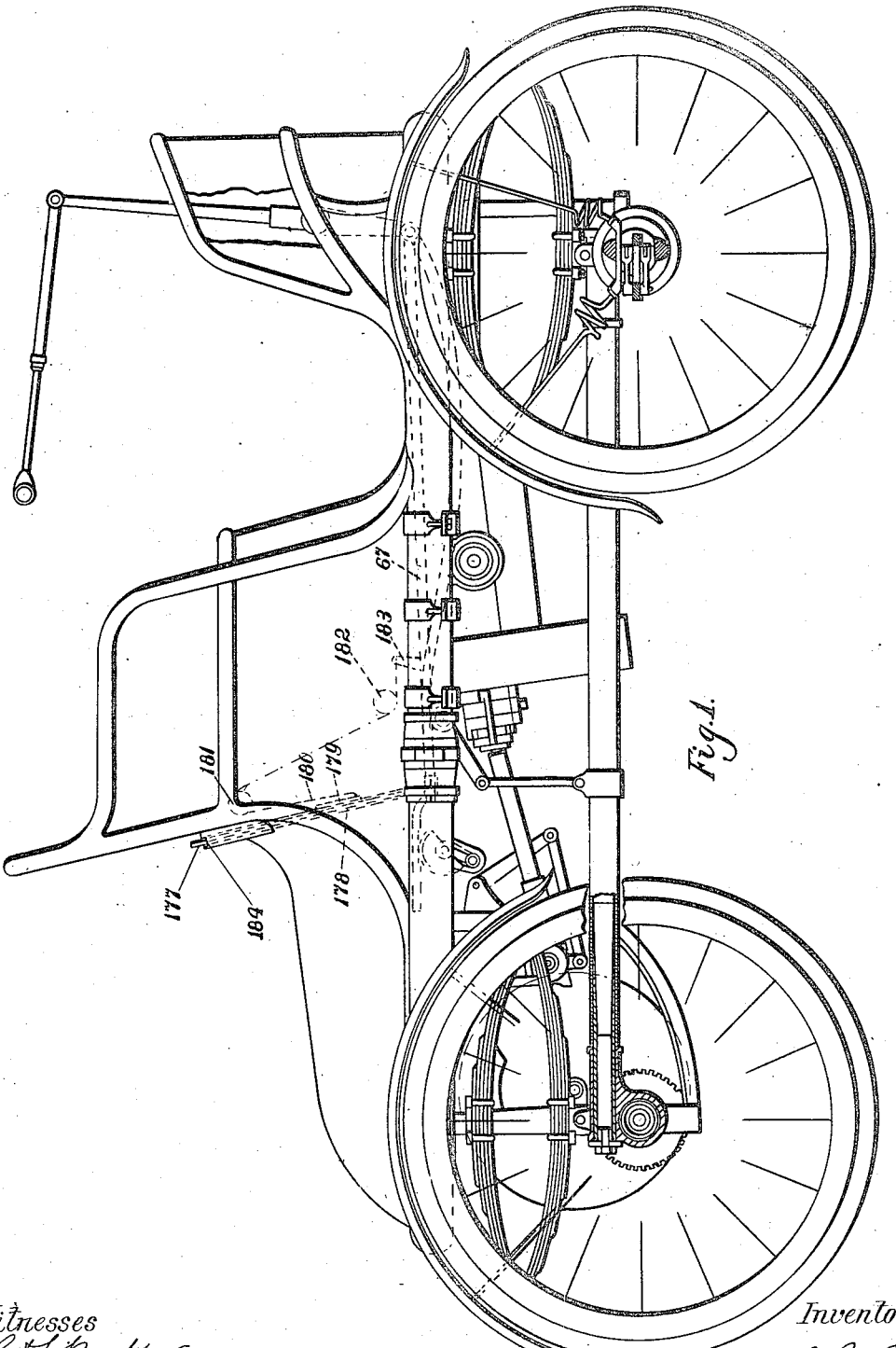
Witnesses
G. H. Baker.
B. M. Kent.
Inventor
Edward P. Cowles
by Foster Freeman Watson + Cox
Attorneys

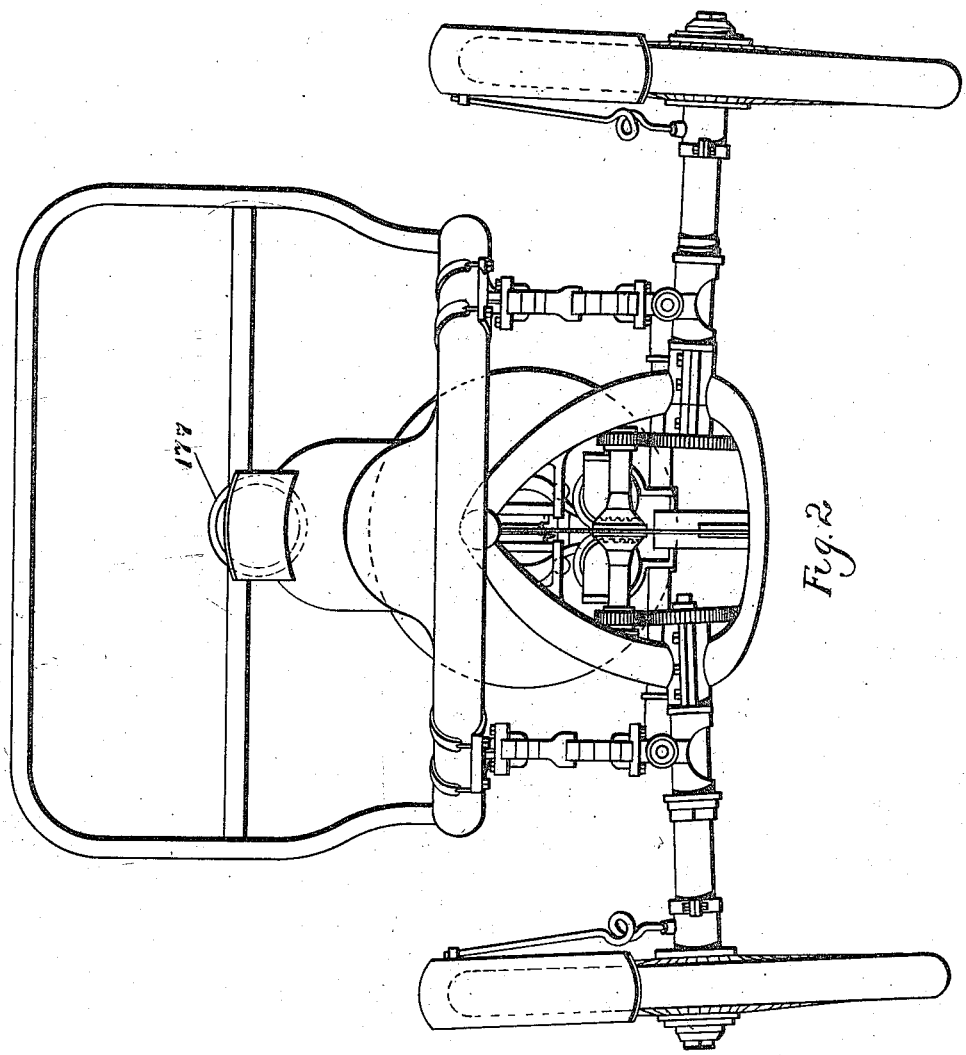

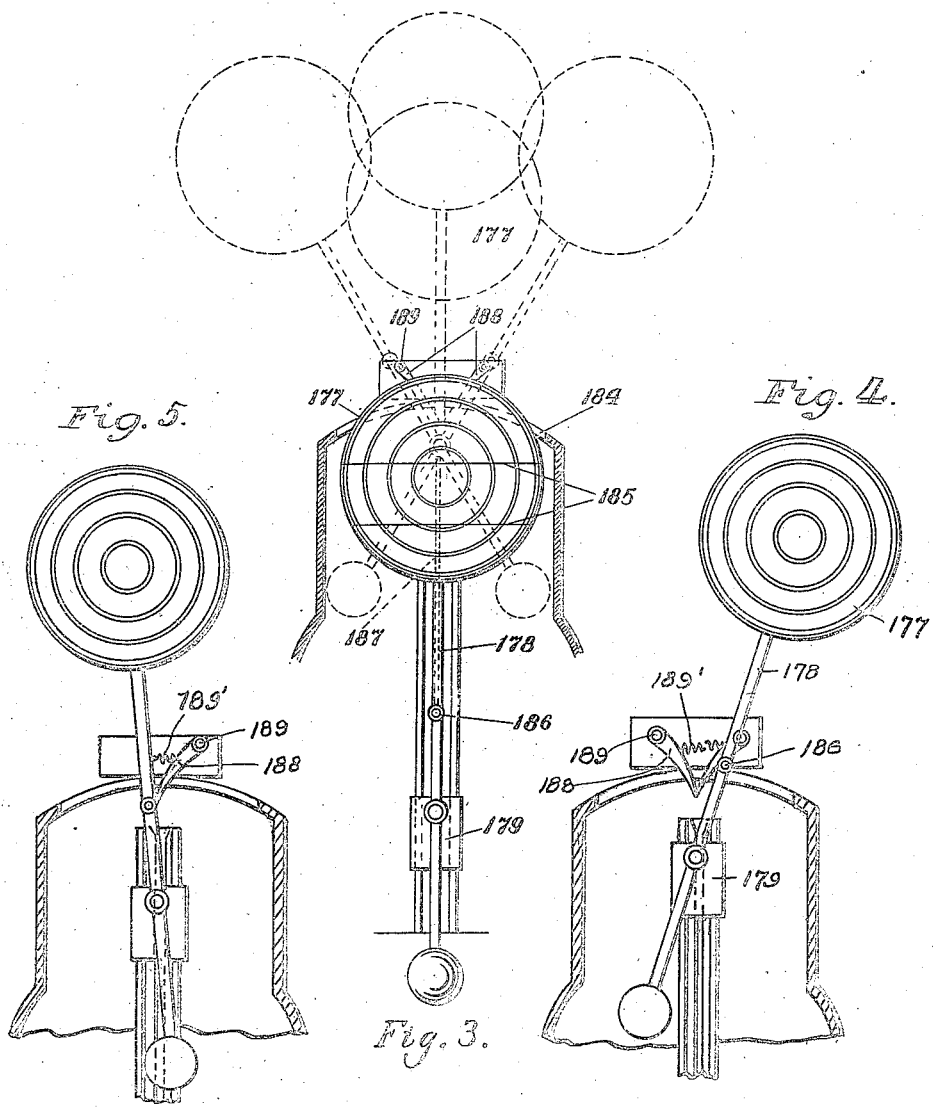

UNITED STATES PATENT OFFICE.

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,193,766.     Specification of Letters Patent.     Patented Aug. 8, 1916.

Original application filed September 6, 1901, Serial No. 74,497. Divided and this application filed April 7, 1914. Serial No. 830,256.

*To all whom it may concern:*

Be it known that I, EDWARD P. COWLES, a citizen of the United States, and resident of Sparta, county of Kent, State of Michigan, have invented certain new and useful Improvements in Motor-Vehicles, of which the following is a specification.

This application is a division of my application Serial No. 714,297, filed August 9, 1912, which in turn is a division of my earlier application, filed September 6, 1901, and issued January 21, 1913, Patent No. 1,050,810.

My present invention relates to motor vehicles and particularly to signal devices therefor.

One of the objects of the invention is to provide means for automatically signaling to following vehicles the intentions of the driver of the preceding vehicle as to slowing down, stopping or reversing.

With this and other objects in view, one embodiment of the invention consists in the construction and arrangement of parts described in the following specification reference being had to the accompanying drawings in which:—

Figure 1 is a side elevation of a motor vehicle embodying the invention; Fig. 2 is a rear view of the same; and Fig. 3 is a view showing the automatic signal for indicating the speed or direction of the motion of the vehicle. Fig. 4 is a view similar to Fig. 3 and showing the parts in a different position. Fig. 5 is a view similar to Fig. 3 and showing a slight modification.

While my invention is applicable to all kinds of motor vehicles and to all kinds of motors, it is specially adapted to that form of driving gear shown and described in my Patent No. 654,716, dated July 31, 1900, and the driving gear outlined in the accompanying drawings is of that general form.

In motor vehicle traffic there is considerable danger of accidents due to the inability of the driver of a following vehicle determining the intentions of the driver of the one forward, as to slowing down, stopping or reversing. It is therefore very desirable to provide a means of signaling such intentions in a way that would unmistakably attract the attention of the driver of a following vehicle. I accomplish this end by use of a signal attached to the running gear and it is displayed, preferably, on the back of the last seat, said signal being automatically operated by the controlling mechanism. This signal can be of any shape, size, color, or artistic design. Preferably I make it in the form of a round disk 177, Fig. 3, about six inches in diameter having in its rear face a series of colored rings. This target or signal disk is attached to a vertical stem 178, extending down into the body where it is attached to a piece 179 adapted to move vertically on suitable guides in the body frame. Piece 179 is connected by cord or chain 180, shown by broken lines, passing over pulleys 181, 182, to a projection 183, on rod 67 of other controlling mechanism. The pulleys 181, 182, serve to change the direction of motion and offset cord 180.

Referring again to my Patent No. 654,716, it will be observed that said rod 67 or its equivalent, when adjusted from its extreme rear position, which position it occupies when the vehicle is moved at the highest speed, moves continuously forward for a change of vehicle movement, from high speed to slow, stop, reverse, and a backward movement of rod 67 reverses this order. Target 177 is adapted so that when rod 67 is in its rear position and the vehicle is moving at a high speed the disk will just appear above a slit 184 in the body, as shown in full lines, Fig. 3. As the rod 67 moves farther forward and the speed of the vehicle decreases the target 177 is raised until at the time the vehicle is moving at its slowest speed it is fully exposed above slit 184. A further movement of rod 67 forward applies the brakes and stops the vehicle, at the same time raising target 177 about three inches above the slit on its stem 178, Fig. 3. A still further movement forward of rod 67 reverses and backs the vehicle at the same time raising target 177 about three inches more. The rearward movement of rod 67 reverses this order giving the target a vertical movement of about twelve inches. It will be seen that this signal not only gives notice in an unmistakable manner to following vehicles what the forward driver's intentions in regard to slowing, stopping, and backing are, but also indicates to persons following approximately the speed at which the preceding vehicle is running. For instance, when the target 177 is just visible above slit 184, the speed is twenty miles or more an hour, when wholly above slit the speed has been reduced to about five miles per hour, and when the disk occupies a position intermediate between these two, the vehicle will be moving at a speed correspondingly intermediate between twenty and five miles per hour. Horizontal lines 185 can be drawn across disk that will indicate a close approximation to the speed of the vehicle.

In an emergency requiring the vehicle to stop and back quickly, there is special liability to accident, particularly where there are many vehicles following closely, making it desirable that the signal for an intention to back should be specially emphasized and calculated to attract attention. This can be accomplished by pivoting the stem 178, of target 177 to sliding piece 179, extending stem 178 downward weighting same, adapting it to flicker or vibrate laterally on piece 179, like a pendulum. A pin 186 in stem 178 slides in a vertical slot 187 to keep the stem from vibrating in its lower position. The upper end of this slot at a point where pin 186 would reach when reversing commences, is divided like the letter Y with a Y-shaped cam 188 in the center. During the reversing process pin 186 slides up one side or the other of cam 188, and together with target 177 is deflected to one side. When reversing is about accomplished pin 186 reaches the top of cam 188, is released and with target 177 commences to vibrate laterally from the force of gravity like a pendulum, making the signal for this movement very emphatic, so that it cannot easily be overlooked or mistaken. Cam 188 is composed of two pieces pivoted to the body at 189, their lower ends forced together by springs 189' in this way forming the apex of the Y. When target 177 descends, pin 186 passes down on the inside of the Y, presses the two pieces 188 open and passes through. One branch of the Y can be dispensed with, if desired, deflecting the target only one way.

Having thus described my invention, what I claim and desire to secure by Letters Patent is:—

1. In a motor vehicle, the combination of devices for controlling the direction of movement and speed of the vehicle, a signal at the rear of the vehicle, and connecting means between said signal and said devices to automatically actuate said signal and cause the latter to indicate to occupants of following vehicles the action of the operator in varying the speed or changing the direction of the vehicle.

2. In a motor vehicle, a signal consisting of a movable disk suitably mounted on the vehicle, connections between said disk and the motor controlling devices whereby the disk will be reciprocated in one direction when the speed of the vehicle is changed, and means for vibrating said signal in another direction when the direction of movement of the vehicle is reversed.

3. In a motor vehicle, the combination of a signal device, means to actuate the same to cause it to indicate vehicle speed by one character of signal, and to indicate direction of movement of the vehicle by another and different character of signal, and control mechanism connected with said means, said mechanism being operable from the driver's seat.

4. In a motor vehicle, a signal, means to cause said signal to assume a variety of positions to indicate certain changes in the operation of the vehicle and to cause said signal to flicker to indicate a different character of change in the operation of the vehicle, and mechanism for operating said means.

5. In a motor vehicle, the combination of the motor control mechanism thereof, a signal device arranged at the rear of the vehicle, means to flicker said signal device, and connections between said means and said motor control mechanism to automatically operate such means.

6. In a motor vehicle, a signal device, means to operate said device to indicate a change in the speed of movement, means to flicker said device after said first means has operated, and a device controlled by the driver for causing the operation of said first means.

In testimony whereof I affix my signature in presence of two witnesses.

EDWARD P. COWLES.

Witnesses:
A. B. CHENEY,
H. M. BALLARD.

It is hereby certified that in Letters Patent No. 1,193,766, granted August 8, 1916, upon the application of Edward P. Cowles, of Sparta, Michigan, for an improvement in "Motor-Vehicles," an error appears in the printed specification requiring correction as follows: Page 1, line 81, for the word "adapted" read *adjusted;* and that the said Letters Patent should be read with this correction therein that the same may conform to the record of the case in the Patent Office.

Signed and sealed this 19th day of September, A. D., 1916.

[SEAL.]

F. W. H. CLAY,
*Acting Commissioner of Patents.*

Cl. 116—31.